United States Patent [19]

Ledieu

[11] Patent Number: 5,166,014
[45] Date of Patent: Nov. 24, 1992

[54] METHOD FOR THE MANUFACTURE OF AN OPTICALLY READABLE DISC, AND DISCS OBTAINED BY THIS METHOD

[75] Inventor: Jean Ledieu, Crespieres, France

[73] Assignee: Digipress, Saint Germain-en-Laye, France

[21] Appl. No.: 615,996

[22] Filed: Nov. 20, 1990

[30] Foreign Application Priority Data

Nov. 21, 1989 [FR] France ................................ 89 15261

[51] Int. Cl.$^5$ .............................................. G01C 3/00
[52] U.S. Cl. ..................................... 430/16; 430/321; 430/323; 430/324; 430/945
[58] Field of Search ................. 430/16, 321, 323, 324, 430/945; 204/5

[56] References Cited

U.S. PATENT DOCUMENTS

| | | | |
|---|---|---|---|
| 4,414,273 | 11/1983 | Wada et al. | 428/336 |
| 4,632,898 | 12/1986 | Fister et al. | 430/942 |
| 4,735,878 | 4/1988 | Hamersley et al. | 430/16 |
| 4,797,316 | 1/1989 | Hecq et al. | 430/323 |
| 4,998,239 | 5/1991 | Strandjord et al. | 430/270 |

FOREIGN PATENT DOCUMENTS 59-003731 4/1984 Japan.
60-007631 5/1985 Japan.
63-023243 6/1988 Japan.
1-076439 7/1989 Japan.
8606203 10/1986 PCT Int'l Appl..

*Primary Examiner*—Marion E. McCamish
*Assistant Examiner*—Mark A. Chapman
*Attorney, Agent, or Firm*—Pollock, VandeSande & Priddy

[57] ABSTRACT

A method for the manufacture of an optically readable disc, notably for providing and fixing the recording of a coded information in a sensitive resin layer applied on a transparent substrate made of an inorganic material, such as notably glass, the resin layer being preferably coated outside by a thin protective layer.

According to the invention, this method is characterized in that it consists in recording in a manner known per se the signal corresponding to the coded information by localized activation of the sensitive layer through the substrate, then to remove the protective layer, to perform the engraving of the substrate through the activated zones of the sensitive layer playing the role of an engraving mask, to remove the remaining of this sensitive layer, to coat the engraved substrate with a thin reflecting metallic layer and finally to deposit on the metallic layer a final protective external layer. The invention relates also to the disc obtained by the method.

11 Claims, 2 Drawing Sheets

METHOD FOR THE MANUFACTURE OF AN OPTICALLY READABLE DISC, AND DISCS OBTAINED BY THIS METHOD

FIELD OF THE INVENTION

The present invention pertains to a manufacturing method of an optically readable disc, particularly of the type know in the technique under the term of "worm" which is the abbreviation of "write once-read many".

BACKGROUND OF THE INVENTION

The invention concerns also the discs obtained by this method, which are meant to be used for long term archival purposes, or more generally supports the utilization conditions of which have to be highly reliable during lengthy periods of time during which the disc can be read as many times as necessary.

Various manufacturing methods of optical read discs of high quality are already known, notably by providing a polished glass disc previously coated with a thin layer or film of a photosensitive resin, in which the coded information which is to be read later is provided in the form of a latent image created by a laser beam modulated by a control assembly as a function of the signal to be encoded. The development and elimination of the resin in the zones where the image has been recorded leave in the film a succession of micro-holes allowing carrying out afterwards, between the portions of the remaining layer, the engraving of the disc in these zones. The resin is then eliminated, notably by oxygen plasma, the engraved face of the disc being finally coated with a thin reflecting metallic layer by vacuum evaporizing, said layer being in turn covered by a final protective layer. The disc thus obtained, which forms a unique original specimen, can be used as such and has, due to the inorganic nature of the materials used, a satisfactory length of life.

As a variant, when one wishes to produce a limited number of specimens of the disc, one can make directly a reproduction mask by using a technique which is substantially similar, then use this mask for making the required number of discs by photolithoengraving.

In one or the other case, the product obtained exhibits a large stability of the engraving and a satisfactory behavior to temperature and moisture, allowing in particular to meet the long term reliability and behavior objectives which are necessary for forming an archival storage medium of quality. However, the product has the disadvantage of being costly, notably when a single disc has to be made or when such a disc has to be manufactured in a very small quantity. In particular, for the person possessing the information to be recorded, the manufacture of a disc of this type requires generally to resort to a specialized laboratory, by handing over to the latter a magnetic tape or similar support allowing transcribing the coded information via a computer controlling the beam recording the sensitive layer. It should be noted that the latter has a smooth surface and does not include a priori any preformatting of the zones to be recorded, and finally that it is directly in contact with the outer environment. Under such conditions, the manufacture of the disc requires using complex and costly installations, as well as regards the necessary equipment as the means for preserving the surface of the disc from the ambient pollution, notably by making it necessary to operate in so-called "blank" premises, with an atmosphere strictly controlled. These elements have a definite incidence on the cost price of the disc, particularly if the required number of such a disc is small, which is generally the case due to the nature of the product in consideration.

In order to reduce the cost, simpler recording assemblies have already been proposed, which can be used by the owner or user himself of the information to be recorded, the engraving being made on "worm" type discs where the support is coated with a thermosensitive layer adapted for recording the image representing the information, this layer being protected outside by an appropriate film, notably composed of a polymerized resin. The recording is made from the opposite face of the transparent support which has been advantageously preformatted to ensure the guiding of the laser beam coming from the recording assembly, which simplifies quite appreciably the design of the latter and therefore the capital costs involved. Moreover, with the aforementioned "worm" type disc, the sensitive layer which receives the recording is permanently protected, notably against the outer environment, by a protective layer, thereby offering the possibility of avoiding having to operate the assembly in a protected environment, since the recording operations can be carried out in a normal atmosphere.

In such a type of disc, the recording of the thermosensitive resin layer is most often achieved by thermal ablation, that is by the formation of holes in this layer, through the glass substrate or support. Each hole corresponds to an elementary signal so that, when reading the disc by a light beam, the diffraction of the latter by the discontinuity created in register with each hole of the layer returns the original signal, each hole being equivalent to an engraved microcup such as that made in a standard disc. A stabilization layer can be advantageously provided between the support and the thermosensitive layer to enhance the recording precision. Such "worm" discs are notably the object of various prior art patents, such as U.S. Pat. No. 4,414,273 and EP-A-0 130 026.

But these discs do not possess a sufficient long term reliability for certain applications, particularly for providing archival media, and do not offer a convenient guarantee of a perfect reproduction of the signal recorded after a period of a few years. The applications are therefore limited, notably to the manufacture of proof discs, the use of traditional methods with the mentioned disadvantages being indispensable each time it is necessary to have a disc with a reliability guaranteed for a long period of time.

BRIEF DESCRIPTION OF THE INVENTION

The present invention relates to a method for making an optical disc of high quality and high reliability, which can be obtained in a more economic way than with standard methods, by allowing notably the user to make himself his own recording and requiring only to resort to a specialized outer laboratory for carrying out a final conditioning operation under conditions which are far less costly than with the traditional methods.

To this effect, the method in consideration for making and fixing the recording of a coded information in the form of discrete holes formed in a sensitive resin layer applied on the transparent substrate, in an inorganic material such as glass notably, the resin layer being preferably coated outside with a protective thin layer, is characterized in that it consists in recording in a manner known per se the signal corresponding to the coded information by localized activation of the sensitive layer through the substrate, then to remove the protective layer, to carry out the engraving of the substrate through the activated zones of the sensitive layer playing the role of an engraving mask, to remove the remaining of the sensitive layer, to coat the engraved substrate with a thin reflecting metallic layer and finally to deposit on the metallic layer a final protective external layer.

Preferably, the activated sensitive layer is a thermosensitive layer, the activation of which provides the recording of the signal consisting in a thermal ablation forming in the layer a plurality of discrete holes. As a variant, the sensitive layer is a photosensitive layer, the activation consisting in an insulation followed by a development of the activated zones.

The previous recording operation of the resin layer, notably thermosensitive, applied on the substrate and then covered with a protective layer such as those provided in a standard "worm" disc, is carried out through the transparent substrate by means of an encoder and of a recording material, presently available in the trade, and providing from preformatted digital data issued from a magnetic tape or other medium information adapted for controlling a lasar beam which, in turn, delivers modulated optical pulses as a function of the signal to be recorded, pyrolyzing the sensitive layer and forming in the latter the necessary holes.

The disc thus recorded is then handed over to a specialized laboratory carrying out the subsequent operations, i.e. the removal of the protective layer, the engraving of the transparent substrate through the sensitive layer forming a mask in register with the holes of the latter, the removal of the remaining portions of the sensitive layer, the metallic deposition of the reflecting film and finally the final setting in position of the protective layer.

The disc thus made according to the method of the invention includes preferably a smooth substrate, made of a transparent inorganic material, notably glass, the thickness of which is substantially 1.2 mm. Advantageously, the layer of pyrolyzable thermosensitive resin deposited on the substrate has a thickness of substantially 200 to 300 nm (nanometers), such a resin being known as such in the field in consideration. The outer protective layer is made for example of a thermosetting resin.

The removal of the protective layer, after formation of the holes in the thermosensitive layer by pyrolysis and local ablation, is made by peeling, a reactive plasma, abrasion, chemical dissolution or any other appropriate means. The engraving of the substrate is then carried out preferably by means of a reactive plasma, notably in a fluorine atmosphere. The remaining of the thermosensitive layer is finally eliminated, advantageously by means of an oxygen atmosphere plasma.

The metallization layer of the engraved surface of the substrate, adapted for assisting the reflection of the reading beam, is then obtained by vacuum evaporizing of an appropriate deposit, in particular gold or other equivalent metal, the thickness of the layer being substantially 900 nm. Finally, the final protective layer is obtained by deposition of an organic or mineral film, particularly in the form of a chromium layer, also provided by metallization under vacuum and having a thickness substantially 2000 nm.

The various structural features of a disc made according to the invention will become more apparent from the reading of the following description of an embodiment, given by way of indication and non limiting, with reference to the accompanying drawings wherein:

DETAILED DESCRIPTION OF THE FIGURES

Figure 1:
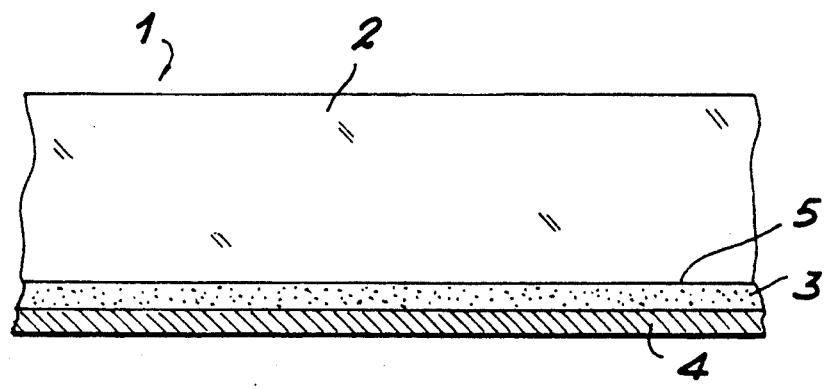
FIGS. 1 and 2 show schematically a fraction of a "worm" disc and of the means adapted for providing, in the thermosensitive layer of the latter, the recording of a coded information in the form of discrete holes, formed in this layer.

In FIG. 1, reference 1 denotes a standard "worm" disc, including notably a substrate 2, preferably in polished glass, or any other transparent inorganic material, this substrate having preferably a thickness substantially 1.2 mm. On one of its faces, substrate 2 is covered by a thin layer 3 of a thermosensitive layer, adapted to be removed locally by pyrolysis, so as to provide the recording in this layer of an appropriate information; the thickness of layer 3 is substantially from 200 to 300 nm. On the aforementioned layer 3 is placed an outer protective coating 4, in a hardening resin or any other appropriate material, possibly metallic, protecting layer 3 against the outer environment. Advantageously, an intermediate film 5 is preferably placed at the interface between substrate 2 and the thermosensitive layer 3, this film forming a stabilization layer with the object notably of enhancing the deposition regularity of the sensitive layer and the homogeneity of its bonding to the substrate.

Figure 2:
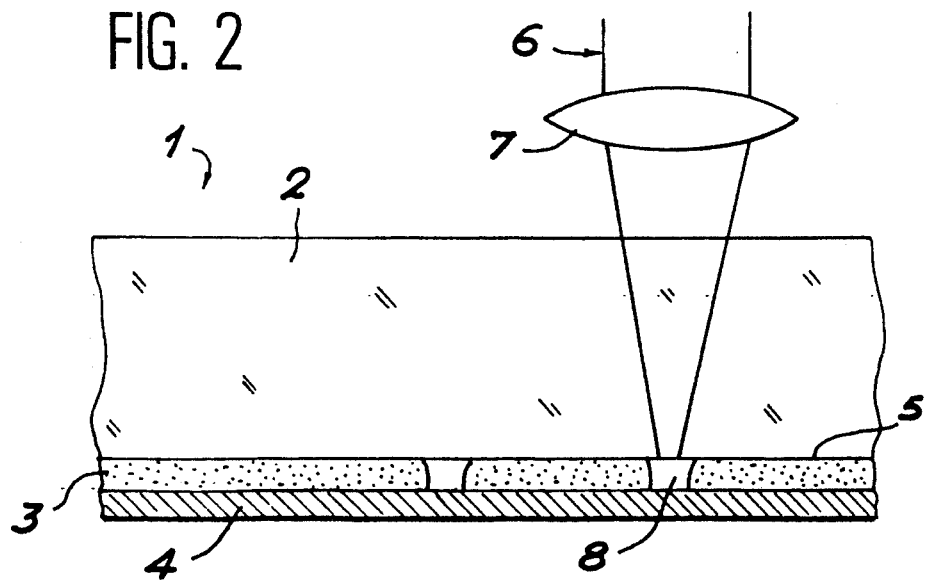

In a manner also known in the technique, the disc 1 thus made is subjected to a recording phase, the general principle of which is shown schematically in FIG. 2, this phase being carried out by means of a laser beam 6 passing through a focusing assembly 7, placed on the opposite side of substrate 2 with respect to the sensitive layer 3. Advantageously, the face of substrate 2 which is adjacent the sensitive layer receiving the laser beam is preformatted, so as to enhance the guiding of the beam during recording of layer 3.

Figure 3:
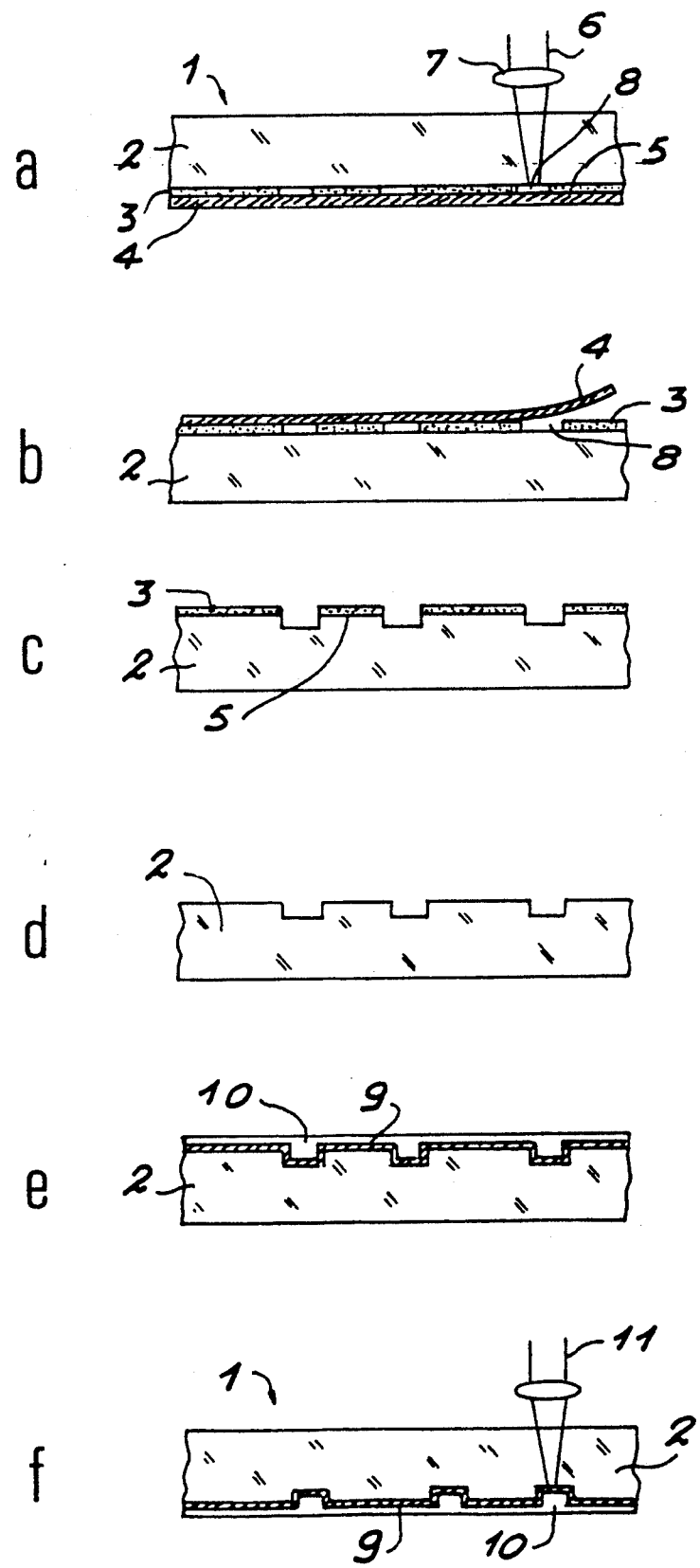
FIG. 3 shows via various steps referenced in this FIG. 3a to 3f the implementation of the following phases of the method from a prerecorded "worm" type disc such as that shown in FIG. 2.

According to the modulation of the beam as a function of the signals to be recorded is thus realized in layer 3 a succession of discrete holes 8 where the material of the layer is eliminated by thermal ablation, due to the pyrolysis created at each point by the impact of the beam; each of these holes 8 forms therefore a microcup, representative of a state of the signal to be recorded. The disc obtained, which forms a standard "worm" disc can then be read so as to control that the recording has been correctly made, prior to handing it over to an outer laboratory performing on the latter the final conditioning steps shown in FIG. 3.

In FIG. 3a is shown the recording "worm" disc according to that shown in FIG. 2. The following step shown schematically in FIG. 3b consists of having turned the disc over, in eliminating the protective layer 4 by an appropriate means, notably by peeling or by a direct suppression in situ via an attack by a reactive plasma or by a mechanical abrasion method, or also by chemical dissolution.

Then one proceeds to the engraving of substrate 2 through the holes 8 formed in the sensitive layer 3, preferably by means of a reactive fluorine atmosphere plasma acting in register with these holes, layer 3 forming between them an engraving mask. The disc thus obtained is shown schematically in FIG. 3c.

During the subsequent step, the remaining of the sensitive layer is eliminated, for example by means of an oxygen atmosphere plasma, so as to leave only the previously engraved substrate 2 shown in FIG. 3d.

The engraved surface of disc 2 is then coated with a reflecting metallic layer 9, obtained notably by vacuum evaporizing, this layer being advantageously made by means of a deposit of gold having a thickness of the order of 900 nm, so as to enhance the final reliability of the product obtained, this deposit of gold being finally coated in turn, as shown in FIG. 3e, with a layer 10 protecting the recording. Preferably, layer 10 is made of a deposit of chromium of a thickness of about 2000 nm, also made by vacuum evaporation, although other materials of organic or mineral origin could also be considered and their deposit on the metallic layer made differently.

The disc thus obtained can be finally returned to the user, who can then read it by means of a laser beam 11, with any assembly adapted to such a reading (FIG. 3f).

DETAILED DESCRIPTION OF THE INVENTION

The method according to the invention allows obtaining an optically readable disc of very high quality and remarkable reliability, which are quite comparable to those resulting from the practice of traditional methods, but avoiding the lengthy and costly recording operations which are necessarily made in a specialized laboratory. Since the materials constituting the disc are primarily of mineral origin (where only the final protective layer can be possibly of organic origin), this disc forms either an archival medium exhibiting a satisfactory length of life, or a recording medium adapted to be used without disadvantage in a severe environment, even under particularly significant temperature and moisture conditions.

Of course, it goes without saying that the invention is not limited to the embodiment more especially described and shown hereabove; on the contrary, it encompasses all the variants thereof. In particular, one could provide the sensitive layer deposited on the substrate not by means of a thermosensitive resin but for example by means of a resin of the photosensitive type. In this case, the development of the layer is carried out in the usual manner, prior to the engraving operation but after removal of the outer protective layer. Likewise, it is clear that the engraving steps and those which follow it, which in the instant example have been assumed carried out in an outer laboratory, could also be made by the user himself if he has at his disposal the necessary means, whereby these steps can be brought to completion sequentially, either manually or automatically.

I claim:

1. A method for manufacturing an optically readable disc comprising the steps:
    applying a sensitive resin layer to a surface of a transparent substrate;
    applying a thin first protective layer to said resin layer;
    positioning a light source in confronting relation to an exposed surface of the substrate, opposite to the surface to which the resin layer has been applied;
    directing light from the source through the substrate to form holes in the sensitive resin layer thereby recording a signal corresponding to coded information;
    removing the protective layer;
    engraving the substrate in areas underlying the holes;
    removing any remaining material of the resin layer;
    applying a thin reflecting metallic layer to said engraved substrate; and
    depositing a second protective layer on an external surface of said metallic layer.

2. The method set forth in claim 1 wherein the sensitive layer is thermosensitive and further wherein the recording of a signal is achieved by thermal ablation of this layer resulting in the formation of holes therein.

3. The method set forth in claim 1 wherein the sensitive layer is photosensitive and further wherein the recording of a signal is achieved by the steps of exposing this layer to light signals to from a latent image of the signal, and developing the layer to from a resist.

4. The method set forth in claim 1 wherein the light source is a laser.

5. The method set forth in claim 1 wherein the substrate engraving is performed is a fluorine atmosphere.

6. The method set forth in claim 1 wherein the removal of remaining resin layer material is achieved by subjecting this layer to an oxygen atmosphere plasma.

7. The method set forth in claim 1 wherein the application of a metallic layer occurs in a vacuum.

8. The method set forth in claim 7 wherein the metallic layer consists of gold.

9. The method set forth in claim 1 wherein the deposited second protective layer consists of organic material.

10. The method set forth in claim 1 wherein the deposited second protective layer consists of mineral material.

11. The method set forth in claim 10 wherein the deposited second protective layer consists of chromium.

* * * * *